No. 685,459. Patented Oct. 29, 1901.
T. J. PHILLIPS & W. G. HODGE.
DEVICE FOR RELEASING CARS.
(Application filed June 7, 1901.)
(No Model.)
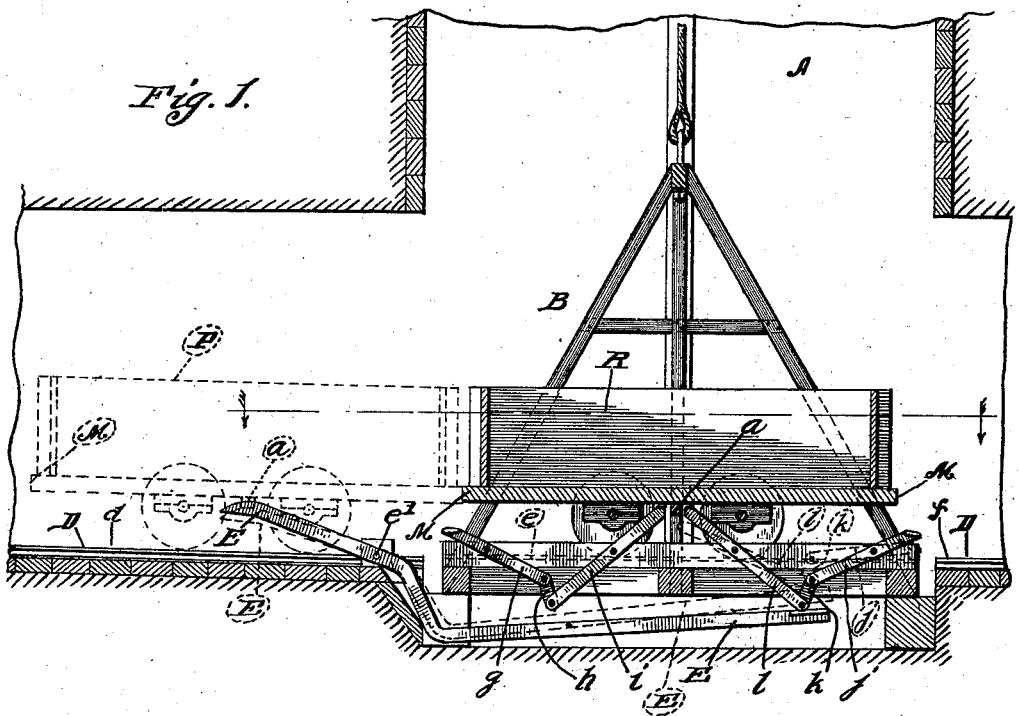
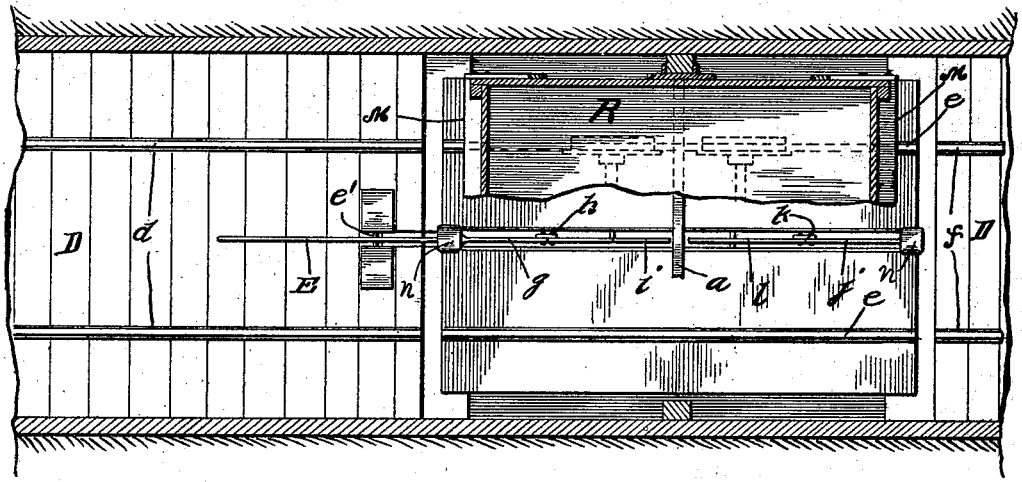

UNITED STATES PATENT OFFICE.

THOMAS J. PHILLIPS, OF OTTUMWA, AND WILLIAM G. HODGE, OF HILTON, IOWA.

DEVICE FOR RELEASING CARS.

SPECIFICATION forming part of Letters Patent No. 685,459, dated October 29, 1901.

Application filed June 7, 1901. Serial No. 63,525. (No model.)

*To all whom it may concern:*

Be it known that we, THOMAS J. PHILLIPS, residing at Ottumwa, in the county of Wapello, and WILLIAM G. HODGE, residing at Hilton, in the county of Monroe, State of Iowa, citizens of the United States, have invented a new and useful Device for Releasing Cars, of which the following is a specification.

Our invention relates to improvements for releasing empty pit-cars from the cage at the bottom of the shaft of a mine; and the purpose of the device is to render the releasing action automatic, impelled by the action of the succeeding car. We secure these results by the mechanism illustrated in the accompanying drawings, in which—

Figure 1 is a vertical section. Fig. 2 is a plan with part of the car-floor broken away, showing the mechanism beneath.

In the drawings, A represents the shaft of a mine, and B the cage which operates in the shaft to raise the loaded cars to be dumped at the surface.

D is the track upon which the cars are propelled to the cage and on which they are allowed to run off the cage when emptied. The track D runs over the cage-floor, but is cut into sections $d\ d$, $e\ e$, and $f f$ at the edge of the cage to allow the cage to ascend from and return to the bottom of the shaft, where the ends of the rails normally register with each other. Cars P and R, adapted to run upon the track D, each have bumpers M M, wheels F, and a cross-bar or stop $a$ beneath the car, by which it is fastened, as hereinafter explained.

The means in use for locking a car upon the cage while it is being hoisted to the surface and returned to the mine are two weighted-lever systems $g\ h\ i$ and $j\ k\ l$, each presenting normally upwardly projecting lever ends $i$ and $l$. The parts $g\ h$ aid in weighting the lever $i$, and the parts $j\ k$ aid in weighting the lever $l$. These lever ends $i$ and $l$ are adapted to be borne downwardly by the stop or cross-bar $a$, fixed on the bottom of the car, as the car moves over them toward $i$ of the system $g\ h\ i$ or toward $l$ of the system $j\ k\ l$, and these weighted levers resuming their normal position after the stop passes leave the stop fastened between the two normally projecting ends, thus locking the car. These lever systems are placed in the floor of the cage, and the upper ends of the levers $g$ and $j$ are arranged to project from the floor at a point under the ends of the car and are flattened upon the top into steps $n\ n$, upon which an operator may tread to trip the lever and release the car. As an improvement upon this device we place the lever E, which we call the "releasing-lever," upon the track and pivot it at $e'$ just outside the shaft in a position to connect with the weighted lever at its rear end. The opposite and outer end of the lever E is rounded or chamfered off to engage with the stop $a$ of an advancing car and be depressed as the car moves upon the track.

Thus arranged and constructed our device operates as follows: With the locked car R returned down the shaft and still locked, but ready to be discharged to the right, the car P is advanced until its stop-bar $a$ engages with the lever E and depresses it, thus also depressing the upwardly-protruding end of the weighted lever $l$ until it is below and out of the way of the stop-bar $a$. The car R is thus unlocked and free to be discharged from the cage and is pushed off down the track by the bumper M of the succeeding car P, which in turn advances over the lever $l$ and is locked in the position of the former, ready to be hoisted. Thus by our device the succeeding car itself unlocks the forward car and sends it down the track, making the use of the steps $n$ unnecessary, although they may be retained for use when no succeeding car is used.

What we claim, and wish to secure by Letters Patent of the United States, is—

1. In a car-releasing device the weighted-lever system $j$, $k$, $l$, in combination with the lever E, substantially as described and shown.

2. In a car-releasing device the weighted-lever system $j$, $k$, $l$ in combination with the lever E and a car having the stop $a$, substantially as described and shown.

3. In a car-releasing device the combination of a car, a weighted-lever system locking the car, a releasing-lever adapted to raise one of the weighted levers and unlock the car, and another car adapted to move upon and operate the releasing-lever, substantially as described and shown.

In testimony whereof we affix our signatures in presence of two witnesses.

THOMAS J. PHILLIPS.
WILLIAM G. HODGE.

Witnesses:
JOHN T. PHILLIPS,
MATHEW L. BYRNE.